(12) United States Patent
Kosmas et al.

(10) Patent No.: US 6,492,624 B2
(45) Date of Patent: Dec. 10, 2002

(54) STOVE OR GRILL FOR COOKING, AND A STOVE OR GRILL FOR COOKING HAVING A GLASS CERAMIC COOK TOP OR HOB, AND A GLASS CERAMIC PLATE COOK TOP OR HOB FOR USE IN A STOVE OR GRILL

(75) Inventors: Ioannis Kosmas, Essenheim (DE); Dietmar Wennemann, Albig (DE); Joachim Grützke, Zaberfeld (DE)

(73) Assignee: Schott Glass, Mainz (DE)

( * ) Notice: Subject to any disclaimer, the term of this patent is extended or adjusted under 35 U.S.C. 154(b) by 0 days.

(21) Appl. No.: 09/758,953

(22) Filed: Jan. 11, 2001

(65) Prior Publication Data

US 2001/0038004 A1 Nov. 8, 2001

(30) Foreign Application Priority Data

Jan. 11, 2000 (DE) .......................... 100 00 657

(51) Int. Cl.$^7$ ................................. H05B 3/68
(52) U.S. Cl. ..................................... 219/460.1
(58) Field of Search ............... 219/450.1, 451.1, 219/452.11, 452.12, 455.11, 460.1, 461.1; 126/39 H, 39 J, 92 A, 92 B, 211, 217

(56) References Cited

U.S. PATENT DOCUMENTS

| 2,238,402 A | * | 4/1941 | Smith | 219/452.11 |
|---|---|---|---|---|
| 2,715,173 A | * | 8/1955 | Farquharson | 219/450.1 |
| 3,830,216 A | * | 8/1974 | Dodd | 126/39 J |
| 4,237,368 A | * | 12/1980 | Welch | 219/448.12 |
| 4,607,609 A | * | 8/1986 | Keating | 126/214 D |
| 5,261,387 A | * | 11/1993 | Gressenich | 126/39 H |
| 5,432,320 A | * | 7/1995 | Scheidler et al. | 219/445.1 |
| 5,994,674 A | * | 11/1999 | Carter | 219/452.11 |
| 6,103,338 A | | 8/2000 | Gille et al. | |
| 6,236,024 B1 | * | 5/2001 | Gotz et al. | 219/452.11 |

FOREIGN PATENT DOCUMENTS

| DE | 8801334 | 3/1988 |
|---|---|---|
| DE | 29519714 | 3/1996 |
| DE | 29521593 | 11/1997 |
| DE | 19703532 | 1/2000 |
| EP | 0464323 | 1/1992 |
| FR | 2726350 | 5/1996 |

* cited by examiner

Primary Examiner—Sang Paik
(74) Attorney, Agent, or Firm—Nils H. Ljungman & Associates

(57) ABSTRACT

Stove or grill having a cook top, hob or cooking surface for cooking food. The cook top or hob is made of a glass ceramic material. The top surface of the cook top or hob has at least one groove-shaped depression to define and separate various zone and cooking areas on the cook top or hob.

20 Claims, 8 Drawing Sheets

STOVE OR GRILL FOR COOKING, AND A STOVE OR GRILL FOR COOKING HAVING A GLASS CERAMIC COOK TOP OR HOB, AND A GLASS CERAMIC PLATE COOK TOP OR HOB FOR USE IN A STOVE OR GRILL

BACKGROUND OF THE INVENTION

1. Field of the Invention

This invention relates to stoves or grills for cooking food. The stove or grill has a cook top or hob that is made of heat conducting material, such as glass ceramic. The cook top has cooking zones for heating cooking utensils located thereon.

This invention further relates to a glass ceramic plate for use in a cook stove or a grilling unit.

2. Background of the Invention

A glass ceramic plate of the prior art is described in EP 0 231 529 B1. Randomly distributed elevations are provided on the surface to ensure that a decorative coating is not abraded and scratched in a visually undesirable manner by cooking vessels being dragged along the cook top and/or by cleaning agents.

German Patent No. 34 33 880 A1 discloses a glass ceramic plate, the decorative coating of which is visibly interrupted in the vicinity of each cooking zone of the glass ceramic plate, to make it possible to scrape off burnt-on food that has been spilled or overflowed from a cooking vessel without thereby damaging the decorative coating. The interruption is necessarily not deeper than the thickness of the decorative coating. Therefore, it can hold only very small quantities of food that have spilled or overflowed.

German Utility Model No. 70 14 047 discloses a grilling and roasting unit in which a grease collection groove runs around a steel plate. The grease groove is formed by a U-shaped profile that is welded onto the steel plate. This configuration is obviously not suitable for use on glass ceramic plates.

On the underside of glass ceramic plates of cook stoves of the prior art, in addition to the cooking zones, there are frequently display elements and/or control elements that are visible or can be activated through the glass ceramic plate.

German Patent No. 295 19 714 U1 describes an operating element on a dielectric plate, in particular a glass ceramic plate, of a household appliance. The plate is provided with a thickness-reducing fingertip-sized indentation opposite a sensing electrode or tap. It is thereby possible for the user to locate a control or operating position with a fingertip even without being able to see it. The functional zones are not defined or separated by different plate thicknesses.

OBJECT OF THE INVENTION

One object of the invention, on a cook top or hob of a stove or grill of the type described above, is to define and separate different cooking or heating zones from one another visually and tactilely.

The object of the invention, on a glass ceramic plate of the type described above, is to define and separate different zones from one another visually and tactilely.

SUMMARY OF THE INVENTION

The invention teaches that at least one groove-shaped depression is realized on the surface of the glass ceramic plate.

The depression has the advantage that it visually separates the individual zones from one another, which facilitates for the user his orientation on the glass ceramic plate. It is thereby possible to substantially eliminate a decorative coating of the glass ceramic plate in whole or in part.

The depressions can be felt by the user, so that he can find certain zones even under conditions of poor visibility.

For the depressions, it is also advantageous that they can hold any food that is being cooked and spills or overflows from cooking vessels, so that the food being cooked does not flow directly into neighboring zones. The depressions are also easy to clean using a scraper that has a profile that in particular matches the cross section profile of the depressions.

In one preferred realization of the invention, the depressions are polished, whereby they also form a clear visual contrast with respect to the glass ceramic plate. The polishing also facilitates the cleaning of the depressions.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

Advantageous configurations of the invention are disclosed in the features of the invention and in the following description, which refers to the exemplary embodiments that are illustrated in the accompanying drawings, in which.

DESCRIPTION OF THE PREFERRED EMBODIMENT

Figure 9:
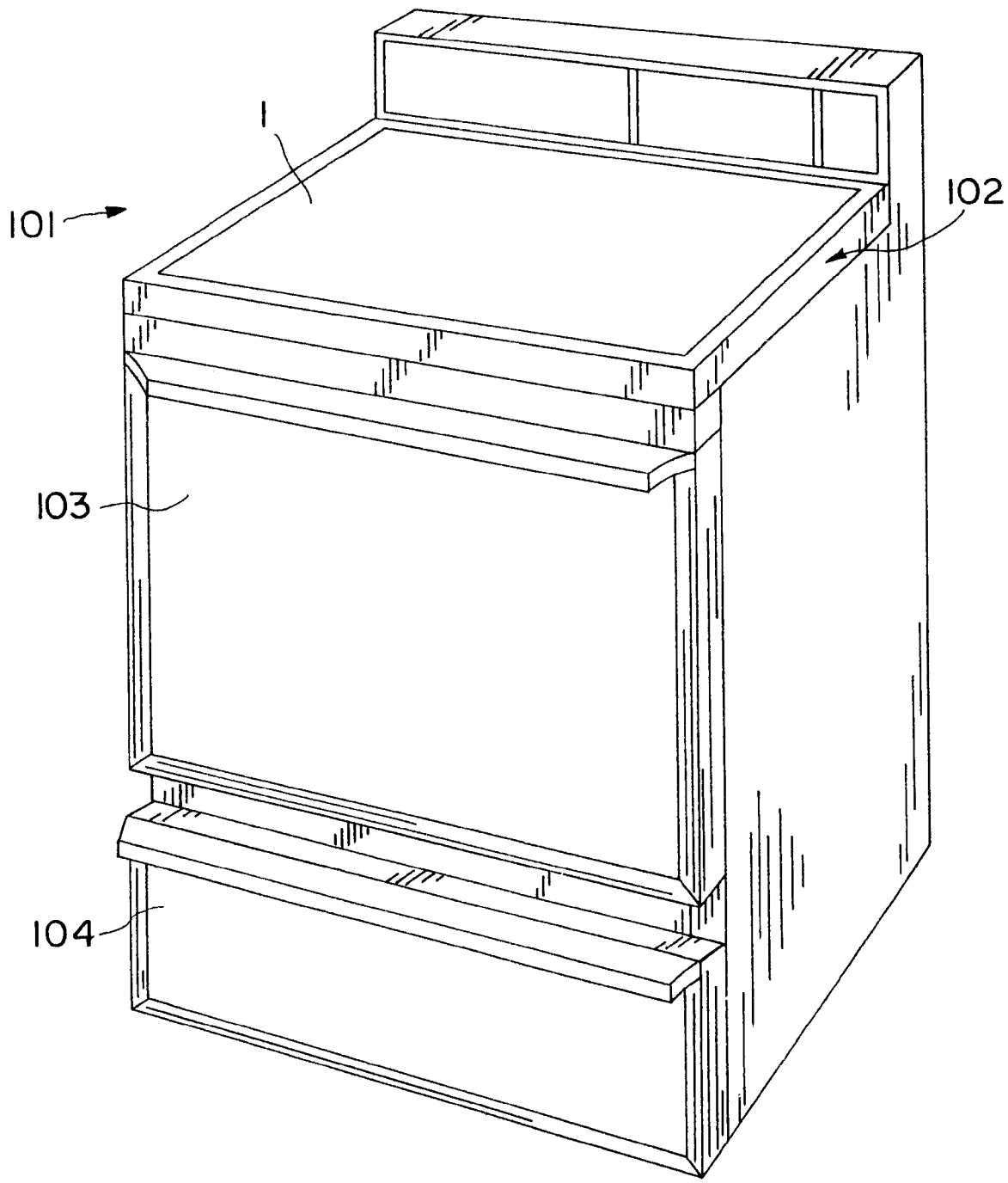
FIG. 9 shows a stove with a cook top or hob, such as glass ceramic cook top or hob, according to at least one embodiment of the present invention.

As seen in FIG. 9 and according to at least one embodiment of the present invention, a glass ceramic cook top, hob, cooking surface, grill, or plate 1 is mounted in or connected to a stove 101. The stove 101 comprises a support structure or frame 102 designed to hold the glass ceramic plate 1. The stove also comprises a main door 103 and an additional door 104 to allow a user access to internal cooking devices such as an oven, broiler, or roaster.

The glass ceramic plate 1 of a cook stove is provided with at least one groove-shaped depression 3 on its visible surface 2 on which the cooking vessels are to be placed. The depression 3 has a width of 5 mm to 30 mm, for example. The depth of the depression is 0.3 mm to 1.5 mm, for example. Possible cross section profiles of the depression 3 are illustrated in FIGS. 1b, 2b, 3b, 6b, 7b and FIG. 8.

It should be understood that the depth and width of the depression 3 are not restricted to the above-mentioned measurement examples or any other measurements described herein. The measurements of the depth and width of the depression 3 described herein are provided simply as illustrative examples of one possible set of dimensions for the depression 3 according to at least one possible embodiment of the present invention.

The depression 3 is created, for example, by grinding, after the glass ceramic plate 1 has run through a ceramization process. The depression 3 is then polished.

On the glass ceramic plate 1 in FIG. 1, the groove-shaped depression 3 runs around an inner zone 4 in which there are cooking zones that are not illustrated in any further detail. The depression 3 thereby separates the inner zone 4 from a peripheral zone 5. In the peripheral zone 5, the glass ceramic plate 1 can be clamped into a support frame that leaves the depression 3 open.

The groove-shaped depression 3 is rounded at the four corners 6. If food is spilled or overflows from a cooking vessel, the spilled food can be collected in the groove-shaped depression 3. The depression 3 can be cleaned simply by wiping it. If the food has already burned on or hardened in the depression 3, it can be removed using a scraper that preferably has the same profile as the depression 3.

Figures 1A, 1B:
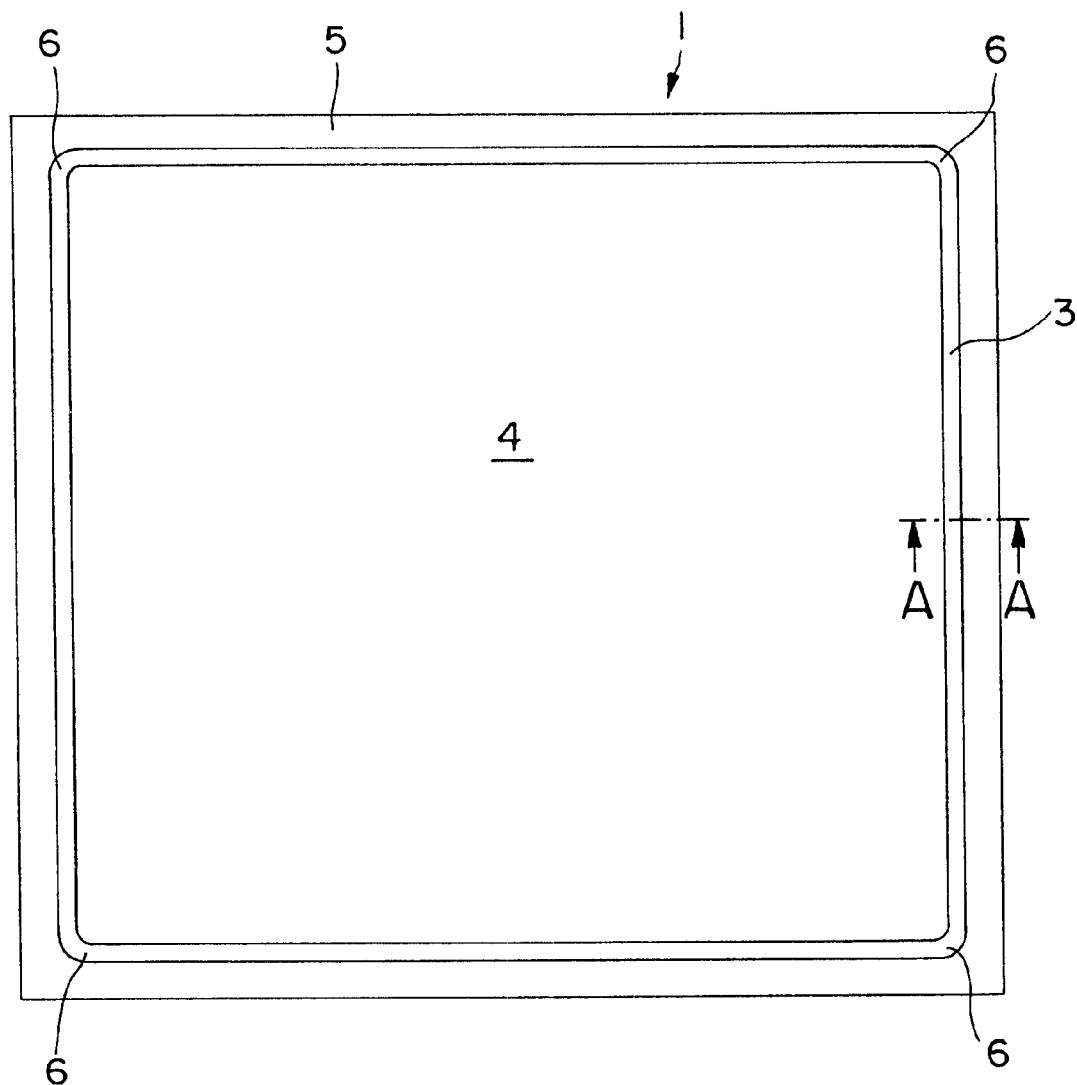
FIG. 1a is a plan view of a glass ceramic plate with an encircling groove-shaped depression.
FIG. 1b is a section along Line A—A in FIG. 1a, shown in an enlarged view.
Figure 2B:
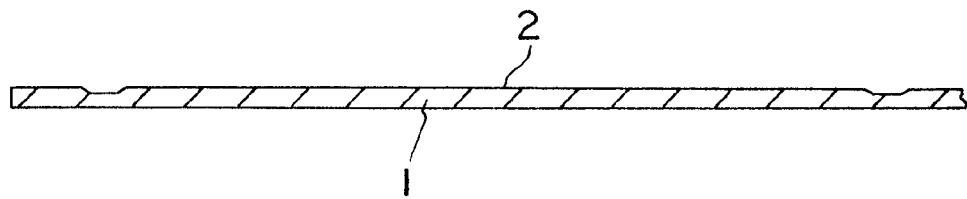
FIG. 2b is a section along Line A—A in FIG. 2a, shown in an enlarged view.
Figure 2A:
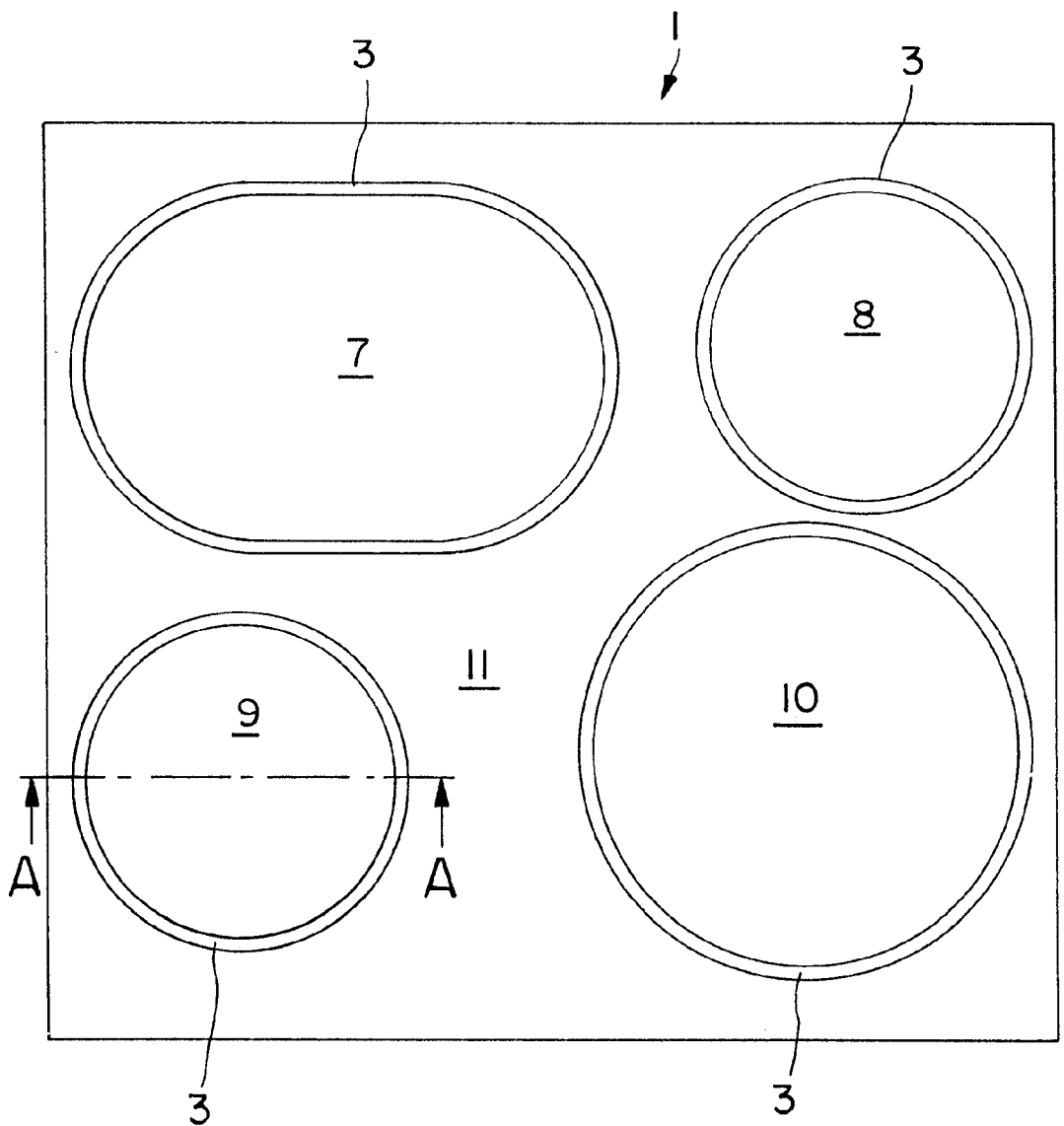
FIG. 2 is a plan view of a glass ceramic plate with groove-shaped depressions that surround individual cooking zones.

In the exemplary embodiment illustrated in FIG. 2, a groove-shaped depression 3 runs around each of the four cooking zones 7, 8, 9, 10 of the glass ceramic plate 1. The four cooking zones 7, 8, 9, 10 are thereby defined and separated from one another. The user can easily recognize the cooking zones and can thus place the cooking vessels on them correctly. A decorative coating of the glass ceramic plate 1 to identify the cooking zones 7, 8, 9, 10 is unnecessary.

The groove-shaped depressions collect any of the food being cooked that spills or overflows in the vicinity of each cooking zone, so that the food does not flow directly into an intermediate zone 11, where it can interfere with any display and/or control elements that may be present.

Figure 3B:
FIG. 3b is a section along Line A—A in FIG. 3a, FIG. 4 is a plan view of a glass ceramic plate with an oval, groove-shaped depression.
Figure 3A:
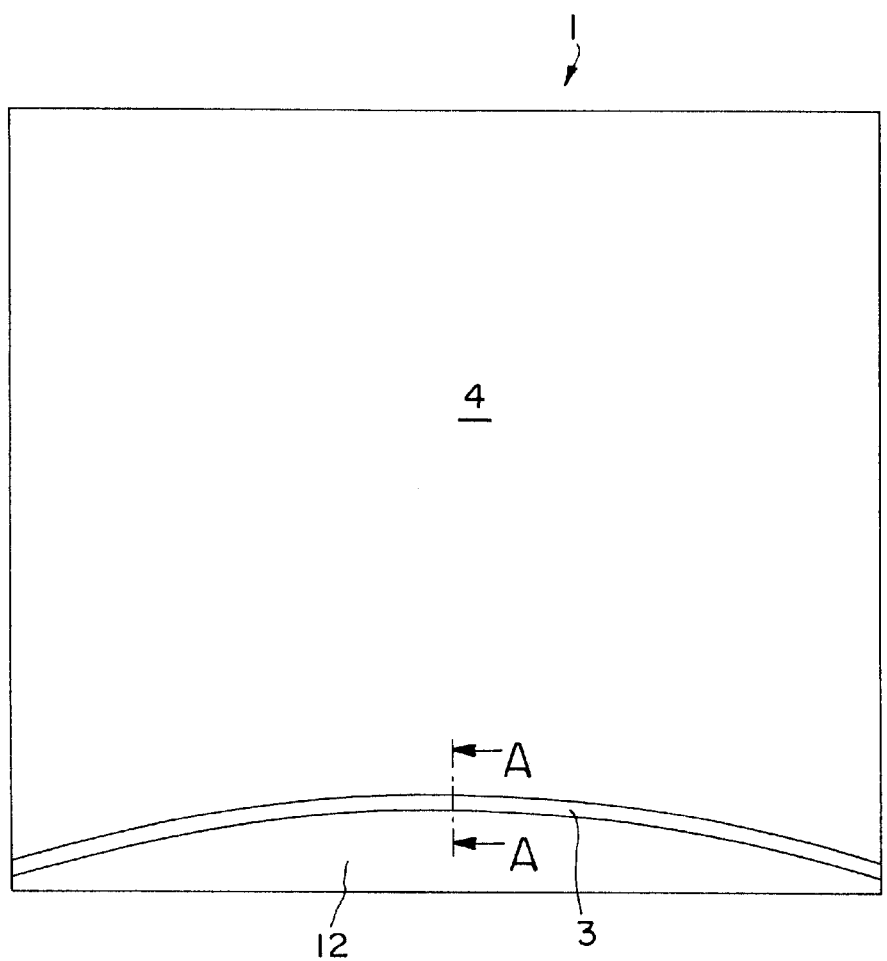
FIG. 3a is a plan view of a glass ceramic plate with a curved groove-shaped depression.

In the exemplary embodiment illustrated in FIG. 3, the inner zone 4, in which the cooking zones are located, is separated from a front zone 12 by a groove-shaped depression 3. The groove-shaped depression 3 runs in a curve from the one lateral edge to the other lateral edge of the glass ceramic plate 1. Display or control elements can be provided in the front zone 12. The groove-shaped depression 3 collects any spilled or overflowing food being cooked before it can flow into the front zone 12. The user can tell from the boundary formed by the groove-shaped depression 3 where the display and control elements are located, without the need for any decorative coating to perform the same function.

Figure 4:
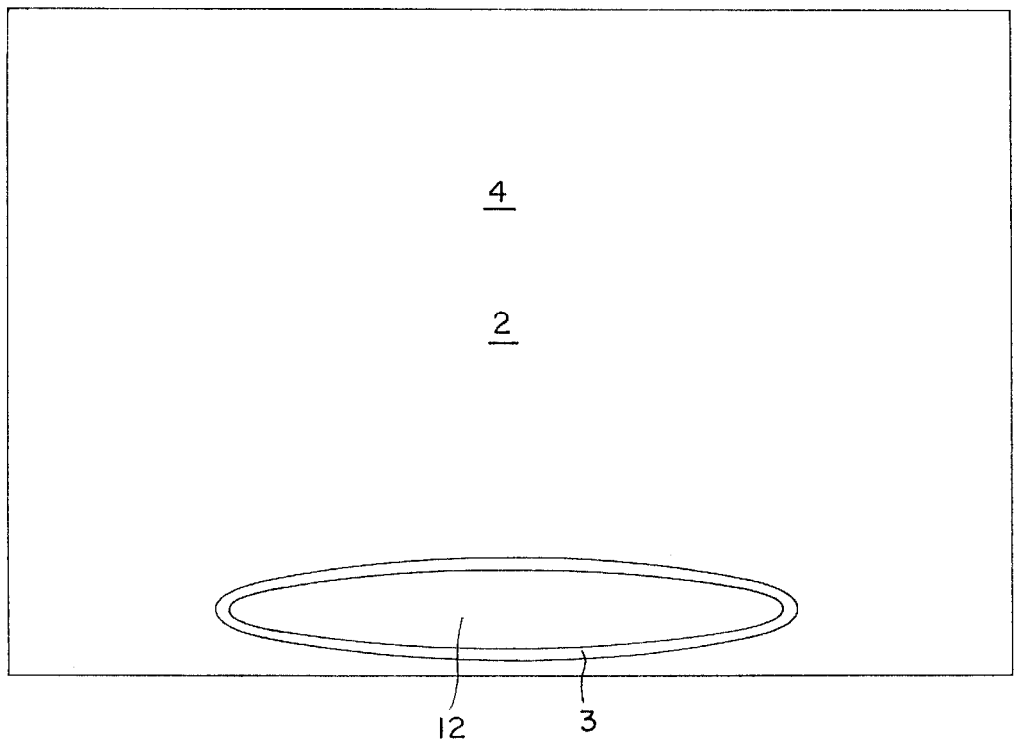

In the exemplary embodiment illustrated in FIG. 4, the groove-shaped depression 3 forms a closed oval which marks the boundary of the front zone 12, in or below which display and/or control elements are located. The boundary informs the user of the position of these elements. The groove-shaped depression 3 collects spilled or overflowing food being cooked before it can flow into the front zone 12.

Figure 5:
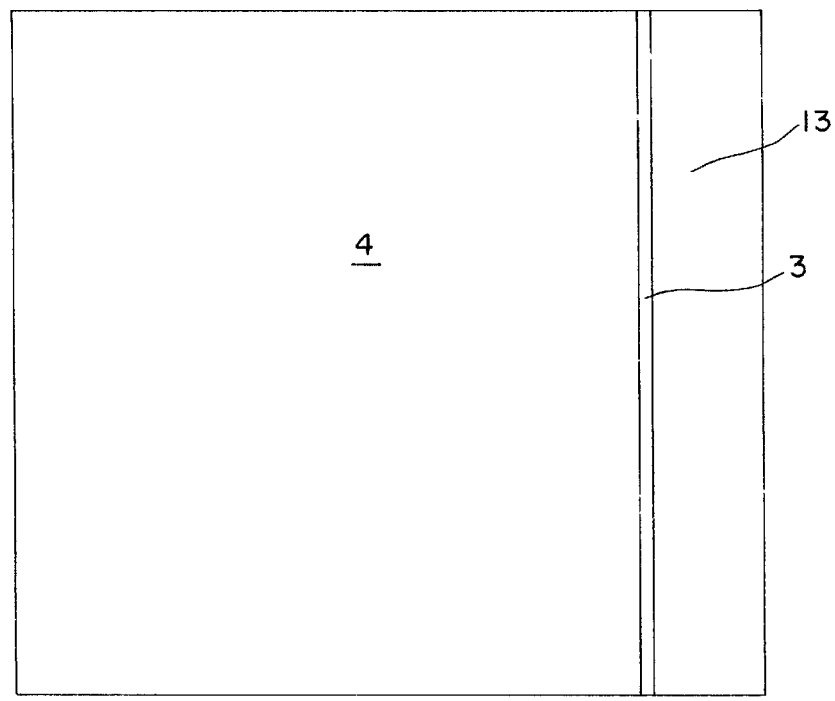
FIG. 5 is a plan view of a glass ceramic plate with a linear, groove-shaped depression.

In the exemplary embodiment illustrated in FIG. 5, the inner zone 4 is defined and separated from a lateral zone 13 by a straight, groove-shaped depression 3. Display and/or control elements are located in the lateral zone 13. The groove-shaped depression 3 performs the function described above with reference to FIGS. 3 and 4.

Figure 6B:
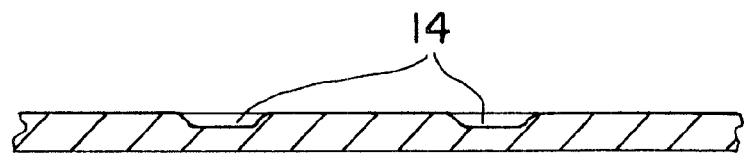
FIG. 6b is a section along Line A—A in FIG. 6a, in an enlarged view.
Figure 6A:
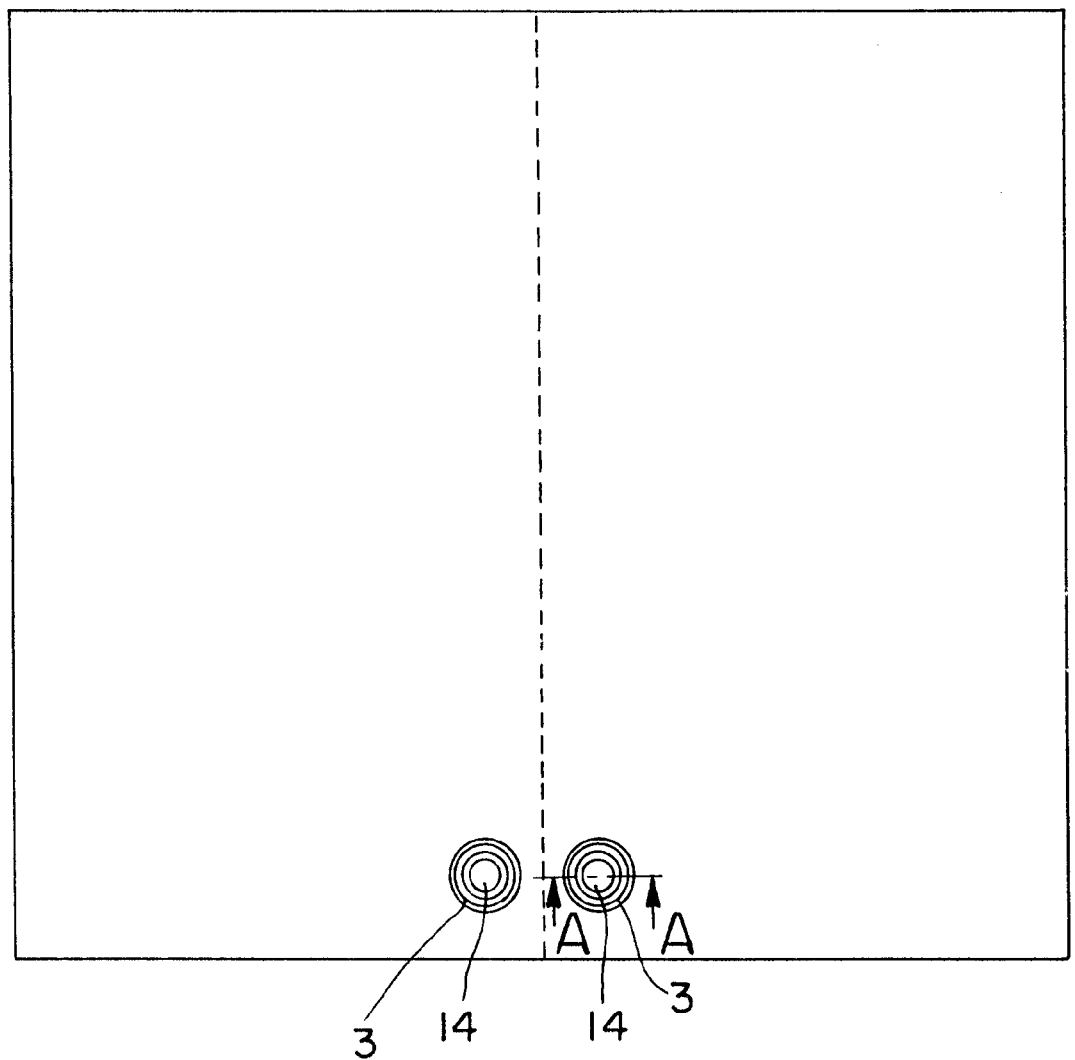
FIG. 6a is a plan view of a glass ceramic plate with two ring-shaped, groove-shaped depressions.

FIG. 6 shows two groove-shaped depressions 3 that surround each control or display zone 14 in a the shape of a ring. The control or display zone 14 has a diameter of approximately 15 mm to 20 mm. Underneath the glass ceramic plate 1, in the vicinity of the control or display zone 14, there is a control sensor or a display element. By means of the ring-shaped depression 3, the user recognizes the position of the control zone 14 both visually and tactilely, which enables him to locate the control zone 14. The depression 3 can collect spilled or overflowing food being cooked. The control zone 14 is clearly defined and separated from its surroundings by the depression 3, as a result of which it becomes easier to recognize and identify the display element.

Figure 7B:
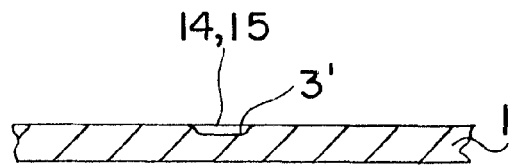
FIG. 7b is a section along Line A—A in FIG. 7a, FIG. 8 shows various cross section profiles of the groove-shaped depression.
Figure 7A:
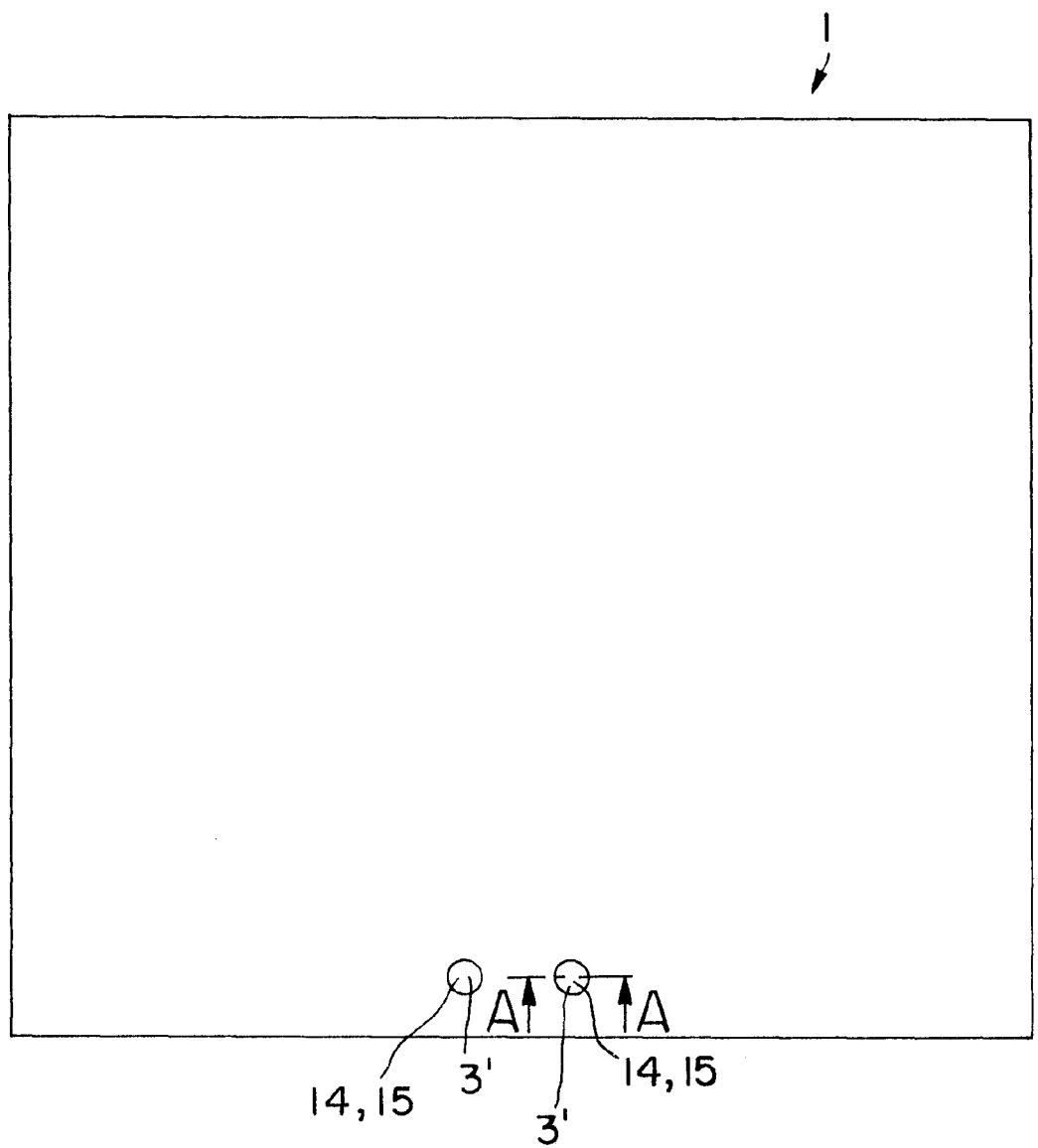
FIG. 7a is a plan view of a glass ceramic plate that has two circular depressions.
Figure 8A:
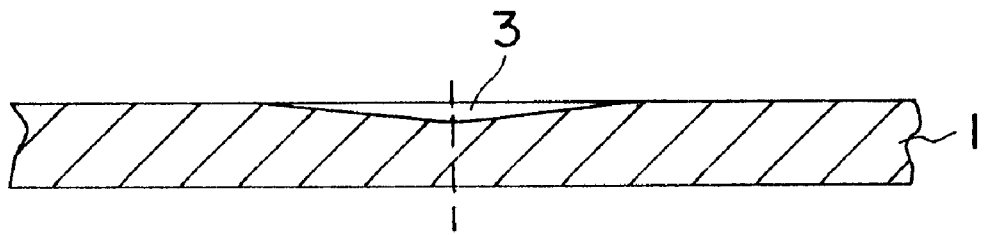
Figure 8B:
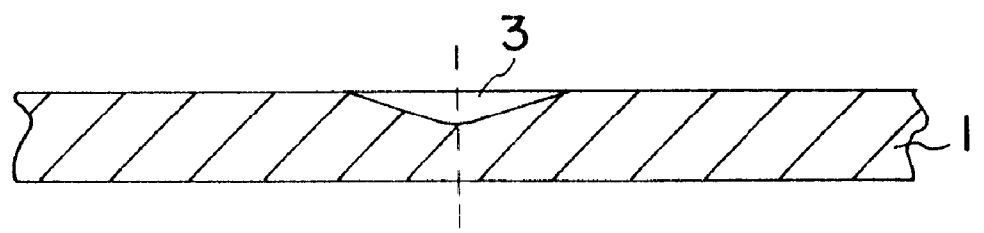
Figure 8C:
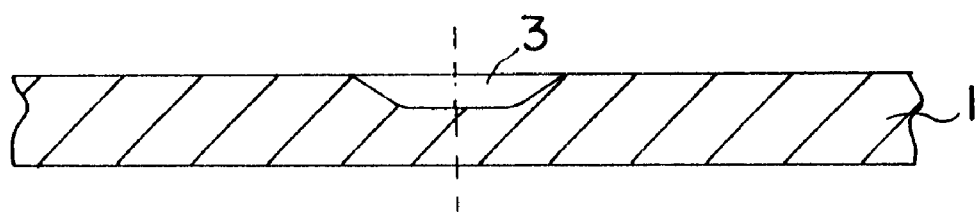
Figure 8D:
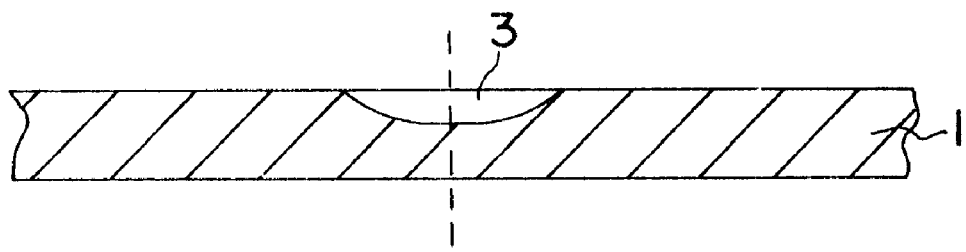

The exemplary embodiment illustrated in FIG. 7 is similar to the exemplary embodiment illustrated in FIG. 6 in terms of its use. FIG. 7 shows two circular molded depressions 3' on the glass ceramic plate, which can be provided in addition to the above mentioned groove-shaped depressions 3. The base 15 of the molded depressions forms a control or display zone 14. Underneath each base 15—on the underside of the glass ceramic plate 1—there is a control and/or display element.

Here, too, the user can easily locate the display or control zone 14, either visually or tactilely.

In the exemplary embodiment illustrated in FIG. 7, any spilled or overflowing food that is being cooked might flow onto the base 15, which is undesirable, because at that point, there is a control sensor that is designed to be activated by contact with a finger, or a display element that must be visible. To prevent spilled or overflowing food from flowing into the circular molded depressions 3' in FIG. 7, the glass ceramic plate 1 can also be provided with one or more groove-shaped depressions 3, as described above.

FIG. 8 shows various cross section profiles of the depressions. FIG. 8a shows a flat V-profile. FIG. 8b shows a deep V-profile. FIG. 8c shows a flat profile that has beveled edges. FIG. 8d shows a C-shaped profile. There are numerous other different possibilities for the configuration of the cross section profile of the depression. In the configuration of the cross section profile and the polishing of the depression 3, care must be taken that there is no danger of breaking the glass ceramic plate 1.

As discussed above, the groove-shaped depressions 3 can catch and retain spills of food or liquid from cooking utensils located on the cook top or hob 1. The depressions 3 are configured to provide a sufficient volume to catch and retain a substantial spill. In the embodiment shown in FIG. 2, the depressions 3 surround cooking zones 7, 8, 9, and 10. The length of the grooves 3 about the perimeter of the zones should be of adequate length to surround a typical cooking utensil such as a pot or pan located in the zone. For example, a typical circular frying pan could be anywhere from 5 to 18 inches in diameter. Therefore, the groove 3 would have to be of sufficient length to surround the area beyond the edge of the frying pan to catch any spills of food or liquid. In the case of a 9 inch pan, for example, the diameter of a circular groove disposed about the cooking zone in which the pan is located could be about 10 inches. Assuming, for example, that the depth of the groove is 0.5 mm and the width of the groove is 10 mm, that means that the groove could hold a spill of up to approximately 2400 mm$^3$.

In another example according to at least one possible embodiment of the present invention, a 15 inch in diameter pot could be used during cooking, which would necessitate an approximately 16 inch in diameter circular depression. Assuming, for example, that the depth of the groove is 1.2 mm and the width of the groove is 25 mm, that means that the groove could hold a spill of up to approximately 26,800 mm$^3$.

It is to be noted that the immediately preceding are only two examples of a vast number of possible configurations and dimensions for the groove-shaped depressions 3. They are simply provided to show possible examples of spill volumes that could be contained during usage of the stove. The groove-shaped depressions 3 can have varying cross-sectional heights, lengths, and widths, and therefore can be designed to catch and retain spills of varying volumes from various types of cooking utensils. The depressions 3 also can have various cross-sectional shapes, such as a C-, V-, or U-shape as discussed above, which would result in varying volume measurements. Therefore, any examples of measurements or configurations contained herein are related to one possible embodiment of the present invention and are not in any way meant to limit the possible embodiments of the present invention to a particular measurement or configuration.

Additional exemplary embodiments result from combinations of the possible configurations described in the above exemplary embodiments.

One feature of the invention resides broadly in a glass ceramic plate for a cook stove or a grilling unit, characterized by the fact that there is at least one groove-shaped depression (3) on the surface of the glass ceramic plate (1).

Another feature of the invention resides broadly in a glass ceramic plate, characterized by the fact that the depression (3) is polished.

Yet another feature of the invention resides broadly in a glass ceramic plate, characterized by the fact that the depression (3) is ground into the surface (2) of the glass ceramic plate (1).

Still another feature of the invention resides broadly in a glass ceramic plate, characterized by the fact that at least one depression (3) forms the boundary of an inner zone (4) of the glass ceramic plate (1) and a peripheral zone (5) and/or a front zone (12) and or a lateral zone (13) of the glass ceramic plate (1).

A further feature of the invention resides broadly in a glass ceramic plate, characterized by the fact that the peripheral zone (5), the front zone (12) and/or the lateral zone (13) are associated with control and/or display elements.

Another feature of the invention resides broadly in a glass ceramic plate, characterized by the fact that at least one groove-shaped depression (3) runs around each cooking zone (7, 8, 9, 10) of the glass ceramic plate (1).

Yet another feature of the invention resides broadly in a glass ceramic plate, characterized by the fact that at least one groove-shaped depression (3) runs around a display or control zone (14) of the glass ceramic plate (1).

Still another feature of the invention resides broadly in a glass ceramic plate, characterized by the fact that in addition to the groove-shaped depression (3), there is at least one circular molded depression (3'), the base (15) of which forms a display or control zone (14).

A further feature of the invention resides broadly in a glass ceramic plate, characterized by the fact that the cross section profile of the depression (3) is in the shape of a V, a U or a C.

Another feature of the invention resides broadly in a glass ceramic plate, characterized by the fact that the depression (3) has a width of 5 mm to 30 mm and a depth of 0.3 mm to 1.5 mm in cross section profile.

The components disclosed in the various publications, disclosed or incorporated by reference herein, may be used in the embodiments of the present invention, as well as equivalents thereof.

The appended drawings in their entirety, including all dimensions, proportions and/or shapes in at least one embodiment of the invention, are accurate and are hereby included by reference into this specification.

All, or substantially all, of the components and methods of the various embodiments may be used with at least one embodiment or all of the embodiments, if more than one embodiment is described herein.

All of the patents, patent applications and publications recited herein, and in the Declaration attached hereto, are hereby incorporated by reference as if set forth in their entirety herein.

The corresponding foreign patent publication application, namely, Federal Republic of Germany Patent Application No. 100 00 657.4-16, filed on Jan. 11, 2000, having inventor Ioannis Kosmas, as well as its published equivalents, and other equivalents or corresponding applications, if any, in corresponding cases in the Federal Republic of Germany and elsewhere, and the references cited in any of the documents cited herein, are hereby incorporated by reference as if set forth in their entirety herein.

The details in the patents, patent applications and publications may be considered to be incorporable, at applicant's option, into the claims during prosecution as further limitations in the claims to patentably distinguish any amended claims from any applied prior art.

Some examples of methods of using stove or grill with glass and/or ceramic which could possibly be utilized or incorporated in at least one possible embodiment of the present invention may be found in the following U.S. Pat. No. 5,990,457, issued to Steiner et al., on Nov. 23, 1999; U.S. Pat. No. 5,821,507, issued to Sasaki, on Oct. 13, 1998; U.S. Pat. No. 5,530,224, issued to Sassman et al., on Jun. 25, 1996; U.S. Pat. No. 5,400,765, issued to Goldstein et al., on Mar. 28, 1995; U.S. Pat. No. 5,425,353, issued to Herbert, on Jun. 20, 1995; U.S. Pat. No. 5,281,131, issued to Goldstein, on Jan. 25, 1994; U.S. Pat. No. 5,273,023, issued to Ebbeson, on Dec. 28, 1993; U.S. Pat. No. 4,264,805, issued to Traut, on Apr. 28, 1981; U.S. Pat. No. Re 29,853, issued to Perl, on Nov. 28, 1978; U.S. Pat. No. 4,894,515, issued to Hurko, on Jan. 16, 1990.

Some examples of stoves, ranges and related components which could possibly be utilized or incorporated in at least one possible embodiment of the present invention may be found in the following U.S. Pat. No. 5,679,273, issued on Oct. 21, 1997; U.S. Pat. No. 5,464,005, issued on Nov. 7, 1995; U.S. Pat. No. 5,448,036, issued on Sep. 5, 1995; U.S. Pat. No. 5,429,114, issued on July 4, 1995; U.S. Pat. No. 5,425,353, issued on Jun. 20, 1995; U.S. Pat. No. 5,406,932, issued on Apr. 8, 1995; U.S. Pat. No. 5,400,765, issued on Mar. 28, 1995; U.S. Pat. No. 5,400,766, issued on Mar. 28, 1995; U.S. Pat. No. 5,380,985, issued on Jan. 10, 1995; U.S. Pat. No. 5,377,660, issued on Jan. 3, 1995; U.S. Pat. No. 5,343,020, issued on Aug. 30, 1994; U.S. Pat. No. 5,290,997, issued on Mar. 1, 1994; U.S. Pat. No. 5,280,152, issued on Jan. 18, 1994; U.S. Pat. No. 5,245,159, issued on Sep. 14, 1993; U.S. Pat. No. 5,220,155, issued on Jun. 25, 1993; U.S. Pat. No. 5,213,091, issued on May 25, 1993; U.S. Pat. No. 4,997,302, issued on Dec. 11, 1990; U.S. Pat. No. 4,597,374, issued on Jul. 1, 1986; U.S. Pat. No. 4,438,210, issued on Mar. 20, 1984; U.S. Pat. No. 4,360,567, issued on Nov. 23, 1982; U.S. Pat. No. 4,351,998, issued on Sep. 28, 1982; U.S. Pat. No. 4,320,275, issued on Mar. 16, 1982; U.S. Pat. No. 4,163,141, issued on Jul. 31, 1979; U.S. Pat. No. 3,941,117, issued on Mar. 2, 1976.

Some examples of ceramic plates or materials which could possibly be utilized or incorporated in at least one possible embodiment of the present invention may be found in the following U.S. Pat. No. 5,691,261, issued on Nov. 25, 1997; U.S. Pat. No. 5,476,684, issued on Dec. 19, 1995; U.S. Pat. No. 5,449,649, issued on Sep. 12, 1995; U.S. Pat. No. 5,422,319, issued on Jun. 6, 1995; U.S. Pat. No. 5,420,399, issued on May 30, 1995; U.S. Pat. No. 5,407,740, issued on Apr. 18, 1995; U.S. Pat. No. 5,397,873, issued on Mar. 14, 1995; U.S. Pat. No. 5,385,873, issued on Jan. 31, 1995; U.S. Pat. No. 4,634,841, issued on Jan. 6, 1987; U.S. Pat. No. 4,414,465, issued on Nov. 8, 1983; U.S. Pat. No. 3,870,861, issued on Mar. 11, 1975; U.S. Pat. No. 3,596,650, issued on Aug. 3, 1971.

Some examples of processes, apparatus, procedures, or materials for melting raw materials to form glass, forming glass, ceraming or ceramization which could possibly be utilized or incorporated in at least one possible embodiment of the present invention may be found in the following U.S. Pat. No. 5,658,835, issued to Onitani et al., on Aug. 19, 1997; U.S. Pat. No. 5,591,682, issued to Goto, on Jan. 7, 1997; U.S. Pat. No. 5,512,520, issued to Pfitzenmaier, on Apr. 30, 1996; U.S. Pat. No. 5,486,495, issued to Jewell et al., on Jan. 23, 1996; U.S. Pat. No. 5,446,008, issued to Krolla et al., on Aug. 29, 1995; U.S. Pat. No. 5,173,453, issued to Beall et al., on Dec. 22, 1992; U.S. Pat. No. 5,010,041, issued to Koyama et al., on Apr. 23, 1991; U.S. Pat. No. 4,536,203, issued to Kramer, on Aug. 20, 1985; U.S. Pat. No. 4,438,210, issued to Rittler, on Mar. 20, 1984; U.S. Pat. No. 4,360,567, issued to Guillevic, on Nov. 23, 1982; U.S. Pat. No. 3,941,117, issued to Pei et al., on Mar. 2, 1976.

Some examples of methods of grinding or using grinding machines which could possibly be utilized or incorporated in at least one possible embodiment of the present invention may be found in the following U.S. Pat. No. 6,168,833, issued to Leushake et al., on Jan. 2, 2001; U.S. Pat. No. 6,126,526, issued to Herrscher et al., on Oct. 3, 2000; U.S. Pat. No. 6,123,606, issued to Hill et al., on Sep. 26, 2000; U.S. Pat. No. 6,113,461, issued to Onoda et al., on Sep. 5, 2000; U.S. Pat. No. 6,106,373, issued to Fabris et al., on Aug. 22, 2000; U.S. Pat. No. 6,120,282, issued to Vilato et al., on Sep. 19, 2000; U.S. Pat. No. 5,931,152, issued to Fafet et al., on Aug. 3, 1999; U.S. Pat. No. 5,428,207, issued to Essig et al., on Jun. 27, 1995; U.S. Pat. No. 4,015,048, issued to Martin, on Mar. 29, 1977.

Some examples of methods of shaping or polishing plates which could possibly be utilized or incorporated in at least one possible embodiment of the present invention may be found in the following U.S. Pat. No. 6,168,506, issued to McJunken, on Jan. 2, 2001; U.S. Pat. No. 6,159,088, issued to Nakajima, on Dec. 12, 2000; U.S. Pat. No. 6,113,467, issued to Koike, on Sep. 5, 2000; U.S. Pat. No. 6,106,369, issued to Konishi et al., on Aug. 22, 2000; U.S. Pat. No. 6,048,261, issued to Broido, on Apr. 11, 2000; U.S. Pat. No. 5,947,797, issued to Buzzetti, on Sep. 7, 1999.

Some examples of methods of using support frame in stove cooking zone which could possibly be utilized or incorporated in at least one possible embodiment of the present invention may be found in the following U.S. Pat. No. 6,146,678, issued to Caridis et al., on Nov. 14, 2000; U.S. Pat. No. 6,114,663, issued to Stockley, on Sep. 5, 2000; U.S. Pat. No. 5,997,930, issued to Kendall et al., on Dec. 7, 1999; U.S. Pat. No. 5,580,598, issued to Benson et al., on Dec. 3, 1996; U.S. Pat. No. 4,949,629, issued to Leary et al., on Aug. 21, 1990; U.S. Pat. No. 4,731,251, issued to Jovanovic, on Mar. 15, 1988; U.S. Pat. No. 4,587,948, issued to Haglund, on May 13, 1986; U.S. Pat. No. 4,176,589, issued to Stuck, on Dec. 4, 1979.

Some examples of methods of using scraper in stove which could possibly be utilized or incorporated in at least one possible embodiment of the present invention may be found in the following U.S. Pat. No. 6,092,459, issued to Zhang, on Jul. 25, 2000; U.S. Pat. No. 6,004,600, issued to Van Over, on Dec. 21, 1999; U.S. Pat. No. 5,351,356, issued to Townsend, Jr. on Oct. 4, 1994; No. 4,706,558, issued to Snyder, Jr. on Nov. 17, 1987; U.S. Pat. No. 4,471,985, issued to Mahoney, on Sep. 18, 1984; U.S. Pat. No. 4,377,015, issued to Baugh, on Mar. 22, 1983.

Some examples of methods of using decorative coating in stove which could possibly be utilized or incorporated in at least one possible embodiment of the present invention may be found in the following U.S. Pat. No. 6,137,072, issued to Martter et al., on Oct. 24, 2000; U.S. Pat. No. 5,830,529, issued to Ross, on Nov. 3, 1998; U.S. Pat. No. 5,823,175, issued to Sweitzer et al., on Oct. 20, 1998; U.S. Pat. No. 5,679,233, issued to Van Anglen et al., on Oct. 21, 1997; U.S. Pat. No. 4,960,978, issued to Lorenz et al., on Oct. 2, 1990; U.S. Pat. No. 4,788,016, issued to Colclough et al., on Nov. 29, 1988.

Some examples of methods of using control panel in stove which could possibly be utilized or incorporated in at least one possible embodiment of the present invention may be found in the following U.S. Pat. No. 6,148,812, issued to Taplan et al., on Nov. 21, 2000; U.S. Pat. No. 6,137,072, issued to Martter et al., on Oct. 24, 2000; U.S. Pat. No. 5,995,877, issued to Brueggemann et al., on Nov. 30, 1999; U.S. Pat. No. 5,981,916, issued to Griffiths et al., on Nov. 9, 1999; U.S. Pat. No. 5,931,150, issued to Bowen et al., on Aug. 3, 1999; U.S. Pat. No. 5,758,636, issued to Butrimas et al., on Jun. 2, 1998; U.S. Pat. No. 5,611,327, issued to Teixeira Filho et al., on Mar. 18, 1997.

The following U.S. Patents are hereby incorporated by reference as if set forth in their entirety herein as follows: U.S. Pat. No. 6,148,812, entitled "Cooking unit, such as a stove, for cooking food" issued to Taplan et al., on Nov. 21, 2000; U.S. Pat. No. 6,111,229, entitled "Cooking appliance such as a stove with arrangement of a ceramic heating element as a cooking zone in a cutout of a cooking space" issued to Schultheis, on Aug. 29, 2000; U.S. Pat. No. 6,050,176, entitled "Arrangement of hot plate in a cook top" issued to Schulthesis et al., on Apr. 18, 2000; U.S. Pat. No.

6,002,112, entitled "Cooking appliance, such as a stove, with a glass-ceramic hob or cooktop with a rapid cooking ring or hotplate" issued to Nass et al., on Dec. 14, 1999.

The invention as described hereinabove in the context of the preferred embodiments is not to be taken as limited to all of the provided details thereof, since modifications and variations thereof may be made without departing from the spirit and scope of the invention.

What is claimed is:

1. A stove or grill for cooking food, said stove or grill comprising:

a housing;

a control panel being disposed in or on said housing;

said control panel being configured to be activated by a user to permit operation of said stove or grill;

a cook top or hob;

said cook top or hob being mounted in or on said housing;

said cook top or hob being configured to provide heat to a cooking utensil or food placed thereon;

said cook top or hob comprising a glass ceramic plate cooking area being configured to provide heat to a cooking utensil or food placed thereon;

said glass ceramic cooking area of said cook top or hob having a top surface configured to receive a cooking utensil or food placed thereon and a bottom surface disposed opposite said top surface;

said glass ceramic cooking area comprising at least one cooking zone;

said top surface of said glass ceramic cooking area having at least one groove-shaped depression disposed about said at least one cooking zone;

said at least one groove-shaped depression being configured to provide a volume to catch and retain a substantial spill or runoff of food or liquid from cooking disposed on said cook top or hob; and said at least one depression being polished to facilitate cleaning of said at least one depression.

2. The stove or grill according to claim 1, wherein said at least one depression is ground into said top surface of said cook top or hob.

3. The stove or grill according to claim 1, wherein:

said top surface comprises at least one inner zone and at least one outer zone; and said at least one depression defines a boundary between said at least one inner zone and at least one outer zone.

4. The stove or grill according to claim 3, wherein said control panel is disposed in said at least one outer zone.

5. The stove or grill according to claim 4, wherein:

said cook top or hob comprises a plurality of cooking zones;

said at least one depression comprises a plurality of depressions;

each of said plurality of cooking zones has a corresponding one of said plurality of depressions disposed about said cooking zone; and said control panel has a corresponding one of said plurality of depressions disposed about said control panel.

6. The stove or grill according to claim 5, wherein each of said plurality of depressions has a cross-section in the shape of one of: a "V", a "U" and a "C".

7. The stove or grill according to claim 2, wherein said at least one depression has a width of 5 mm to 30 mm and a depth of 0.3 mm to 1.5 mm in cross section profile.

8. The stove or grill according to claim 6, wherein:

said cooktop or hob comprises at least one circular molded depression;

said at least one circular molded depression has a base section which comprises one of a display zone or a control zone;

each of said plurality of depressions has a depth configured to be felt by a finger of a user to assist in locating said glass ceramic cooking area under conditions of poor visibility, and configured to assist a user in visually separating different portions of said glass ceramic cooking area; and each of said plurality of depressions is polished to also form a visual contrast with respect to said glass ceramic cooking area.

9. A stove for cooking food, said stove comprising:

a housing;

a control panel being disposed in or on said housing;

said control panel being configured to be activated by a user to permit operation of said stove;

a cook top;

said cook top being mounted in or on said housing;

said cook top being configured to provide heat to a cooking utensil placed thereon;

said cook top comprising a glass ceramic plate cooking area being configured to provide heat to a cooking utensil placed thereon;

said glass ceramic cooking area of said cook top having a top surface configured to receive a cooking utensil placed thereon and a bottom surface disposed opposite said top surface;

said glass ceramic cooking area comprising at least one cooking zone;

said top surface of said glass ceramic cooking area having at least one groove-shaped depression disposed about said at least one cooking zone;

said at least one groove-shaped depression being configured to provide a volume to catch and retain a substantial spill of food or liquid from a cooking utensil disposed on said cook top; and said at least one depression being polished to facilitate cleaning of said at least one depression.

10. The stove according to claim 9, wherein said at least one depression is ground into said top surface of said cook top.

11. The stove according to claim 10, wherein said at least one depression has a width of 5 mm to 30 mm and a depth of 0.3 mm to 1.5 mm in cross section profile.

12. The stove according to claim 11, wherein:

said top surface comprises at least one inner zone and at least one outer zone;

said at least one depression defines a boundary between said at least one inner zone and at least one outer zone; and said control panel is disposed in said at least one outer zone.

13. The stove according to claim 12, wherein:

said cook top comprises a plurality of cooking zones;

said at least one depression comprises a plurality of depressions;

each of said plurality of cooking zones has a corresponding one of said plurality of depressions disposed about said cooking zone; and said control panel has a corresponding one of said plurality of depressions disposed about said control panel.

14. The stove according to claim 13, wherein:

each of said plurality of depressions has a cross-section in the shape of one of: a "V", a "U" and a "C";

said cooktop comprises at least one circular molded depression;

said at least one circular molded depression has a base section which comprises one of a display zone or a control zone;

each of said plurality of depressions has a depth configured to be felt by a finger of a user to assist in locating said glass ceramic cooking area under conditions of poor visibility, and configured to assist a user in visually separating different portions of said glass ceramic cooking area; and each of said plurality of depressions is polished to also form a visual contrast with respect to said glass ceramic cooking area.

15. A grill for cooking food, said grill comprising:

a housing;

a control panel being disposed in or on said housing;

said control panel being configured to be activated by a user to permit operation of said grill;

a cook top;

said cook top being mounted in or on said housing;

said cook top being configured to provide heat to food placed thereon;

said cook top comprising a glass ceramic plate cooking area being configured to provide heat to food placed thereon;

said glass ceramic cooking area of said cook top having a top surface configured to receive food placed thereon and a bottom surface disposed opposite said top surface;

said glass ceramic cooking area comprising at least one cooking zone;

said top surface of said glass ceramic cooking area having at least one groove-shaped depression disposed about said at least one cooking zone;

said at least one groove-shaped depression being configured to provide a volume to catch and retain a substantial runoff of food or liquid from food cooking on said cook top; and said at least one depression being polished to facilitate cleaning of said at least one depression.

16. The grill according to claim 15, wherein said at least one depression is ground into said top surface of said cook top.

17. The grill according to claim 16, wherein said at least one depression has a width of 5 mm to 30 mm and a depth of 0.3 mm to 1.5 mm in cross section profile.

18. The grill according to claim 17, wherein:

said top surface comprises at least one inner zone and at least one outer zone;

said at least one depression defines a boundary between said at least one inner zone and at least one outer zone; and said control panel is disposed in said at least one outer zone.

19. The grill according to claim 18, wherein:

said cook top comprises a plurality of cooking zones;

said at least one depression comprises a plurality of depressions;

each of said plurality of cooking zones has a corresponding one of said plurality of depressions disposed about said cooking zone; and said control panel has a corresponding one of said plurality of depressions disposed about said control panel.

20. The grill according to claim 19, wherein:

each of said plurality of depressions has a cross-section in the shape of one of: a "V", a "U" and a "C";

said cooktop comprises at least one circular molded depression;

said at least one circular molded depression has a base section which comprises one of a display zone or a control zone;

each of said plurality of depressions has a depth configured to be felt by a finger of a user to assist in locating said glass ceramic cooking area under conditions of poor visibility, and configured to assist a user in visually separating different portions of said glass ceramic cooking area; and each of said plurality of depressions is polished to also form a visual contrast with respect to said glass ceramic cooking area.

* * * * *

UNITED STATES PATENT AND TRADEMARK OFFICE
CERTIFICATE OF CORRECTION

PATENT NO. : 6,492,624 B2
DATED : December 10, 2002
INVENTOR(S) : Ioannis Kosmas, Dietmar Wennemann and Joachim Grützke It is certified that error appears in the above-identified patent and that said Letters Patent is hereby corrected as shown below:

<u>Column 9,</u>
Line 44, after "claim", delete "1," and insert -- 7, --.

Signed and Sealed this

Twenty-seventh Day of May, 2003

JAMES E. ROGAN
*Director of the United States Patent and Trademark Office*

UNITED STATES PATENT AND TRADEMARK OFFICE
CERTIFICATE OF CORRECTION

PATENT NO.     : 6,492,624 B2                                                Page 1 of 1
DATED          : December 2, 2002
INVENTOR(S)    : Ioannis Kosmas, Dietmar Wennemann and Joachim Grützke It is certified that error appears in the above-identified patent and that said Letters Patent is hereby corrected as shown below:

<u>Title page,</u>
Item [73], delete "Assignee:" and insert -- Assignees: --.
Add the following second Assignee: -- BSH Bosch und Siemens Hausgerate GmbH, Munchen (DE) --.

Signed and Sealed this

Twenty-eighth Day of October, 2003

JAMES E. ROGAN
*Director of the United States Patent and Trademark Office*